(12) United States Patent
Silverstein et al.

(10) Patent No.: US 11,856,060 B2
(45) Date of Patent: Dec. 26, 2023

(54) PLANNED MESSAGE NOTIFICATION FOR IOT DEVICE BASED ON ACTIVITY

(71) Applicant: International Business Machines Corporation, Armonk, NY (US)

(72) Inventors: Zachary A. Silverstein, Jacksonville, FL (US); Jacob Ryan Jepperson, Austin, TX (US); Craig M. Trim, Ventura, CA (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 16/984,594

(22) Filed: Aug. 4, 2020

(65) Prior Publication Data
US 2022/0046093 A1    Feb. 10, 2022

(51) Int. Cl.
*G16Y 40/35*  (2020.01)
*H04L 67/12*  (2022.01)
*G16Y 40/20*  (2020.01)
*G16Y 30/00*  (2020.01)

(52) U.S. Cl.
CPC .............. *H04L 67/12* (2013.01); *G16Y 30/00* (2020.01); *G16Y 40/20* (2020.01); *G16Y 40/35* (2020.01)

(58) Field of Classification Search
CPC ........ H04L 67/12; G16Y 30/00; G16Y 40/20; G16Y 40/35
See application file for complete search history.

(56) References Cited

U.S. PATENT DOCUMENTS

| | | | |
|---|---|---|---|
| 6,757,713 B1 | 6/2004 | Ogilvie | |
| 9,462,570 B1 | 10/2016 | Bostick | |
| 9,491,251 B2 | 11/2016 | Deeter | |
| 10,499,192 B2 | 12/2019 | Walter | |
| 2008/0185772 A1 | 8/2008 | Duarte | |
| 2014/0057606 A1* | 2/2014 | Kunjithapatham | H04L 51/14 455/412.2 |
| 2015/0134761 A1* | 5/2015 | Sharma | H04L 67/22 709/207 |
| 2017/0070468 A1* | 3/2017 | Renshaw | H04W 4/21 |

(Continued)

FOREIGN PATENT DOCUMENTS

| | | |
|---|---|---|
| JP | 2016194089 A1 | 6/2017 |
| WO | 2018165470 A1 | 9/2018 |

*Primary Examiner* — Jason D Recek
(74) *Attorney, Agent, or Firm* — Marcus Walker; Heather Johnston (57) ABSTRACT

Aspects of the present invention disclose a method for delivering a notification to an IoT enabled device that ensures successful user notification while avoiding duplicate notifications. The method includes one or more processors capturing a respective activity pattern of each of a plurality of internet of things (IoT) enabled devices of a user. The method further includes determining an active device of the user from the plurality of IoT enabled devices based at least in part on an activity pattern of the active device. The method further includes identifying a notification for distribution to the user, utilizing the plurality of IoT enabled devices. The method further includes intercepting delivery of the notification to non-active devices of the plurality of IoT enabled devices. The method further includes transmitting the notification to the active device of the user.

20 Claims, 3 Drawing Sheets

(56) References Cited

U.S. PATENT DOCUMENTS

| | | | |
|---|---|---|---|
| 2018/0026920 A1* | 1/2018 | Chen | H04W 68/005 |
| | | | 455/466 |
| 2018/0167908 A1* | 6/2018 | Kotreka | H04W 4/14 |
| 2018/0373399 A1* | 12/2018 | Battula | G06F 3/0482 |
| 2019/0082416 A1 | 3/2019 | Deluca | |
| 2019/0138992 A1 | 5/2019 | Chaudhri | |
| 2020/0154448 A1* | 5/2020 | Wilmunder | G06F 1/28 |
| 2020/0387411 A1* | 12/2020 | Chu | G06F 16/5866 |
| 2021/0141517 A1* | 5/2021 | Camargo | H04L 67/535 |
| 2021/0209540 A1* | 7/2021 | Bhide | H04L 51/222 |

* cited by examiner

PLANNED MESSAGE NOTIFICATION FOR IOT DEVICE BASED ON ACTIVITY

BACKGROUND OF THE INVENTION

The present invention relates generally to the of mobile devices, and more particularly to notification systems of a plurality of Internet of Things (IoT) enabled devices.

In recent years, developments and the growth of Internet of Things (IoT) capable devices have created a wealth of opportunities to advance the capabilities to integrate systems. The internet of things (IoT) is the internetworking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each thing is uniquely identifiable through its embedded computing system but is able to interoperate within the existing Internet infrastructure.

Hooking covers a range of techniques used to alter or augment the behavior of an operating system, of applications, or of other software components by intercepting function calls or messages or events passed between software components. Typically, hooks are inserted while software is already running, but hooking is a tactic that can also be employed prior to the application being started. Hooks may be utilized to add new functionalities to applications, also facilitating the communication between the other processes and messages of the system.

SUMMARY

Aspects of the present invention disclose a method, computer program product, and system for delivering a notification to an IoT enabled device that ensures successful user notification while avoiding duplicate notifications. The method includes one or more processors capturing a respective activity pattern of each of a plurality of internet of things (IoT) enabled devices of a user. The method further includes one or more processors determining an active device of the user from the plurality of IoT enabled devices based at least in part on an activity pattern of the active device. The method further includes one or more processors identifying a notification for distribution to the user, utilizing the plurality of IoT enabled devices. The method further includes one or more processors intercepting delivery of the notification to non-active devices of the plurality of IoT enabled devices. The method further includes one or more processors transmitting the notification to the active device of the user.

DETAILED DESCRIPTION

Embodiments of the present invention allow for notification delivery to one or more Internet of Things (IoT) devices to ensure user notification and prevent notification redundancy. Embodiments of the present invention intercept delivery of a notification to a plurality of IoT enabled devices and provides the notification to a user based on activity patterns of a computing device.

Some embodiments of the present invention recognize that in an internet of things (IoT) environment, notification alerts may not provide the intended value without being a distraction, burden, or over implemented feature. For example, many users deal with a multitude of push notifications daily and managing incoming notifications can be challenging at times. Additionally, if a user ignores push notifications while working on unrelated task, the push notifications lose value immediately and contrary to a purpose of the push notification. Embodiments of the present invention minimize the amount of push notifications to the user, yielding tremendous value to the user. As a result, embodiments of the present invention direct the attention of the user to notifications of vital importance.

Embodiments of the present invention advances the field of push notifications in an IoT environment by providing the ability to eliminate notification redundancy when notification duplicates are generated. In additional embodiments, the present invention can operate to reduce network resources utilized to deliver alert notifications to on one or more IoT enabled devices. Additionally, embodiments of the present invention processing resources utilized to perform the task of delivering the notification alert on one or more IoT enabled devices. As a result, reducing the battery power utilized by the one or more IoT enabled devices by eliminating redundant notifications.

Implementation of embodiments of the invention may take a variety of forms, and exemplary implementation details are discussed subsequently with reference to the Figures.

Figure 1:
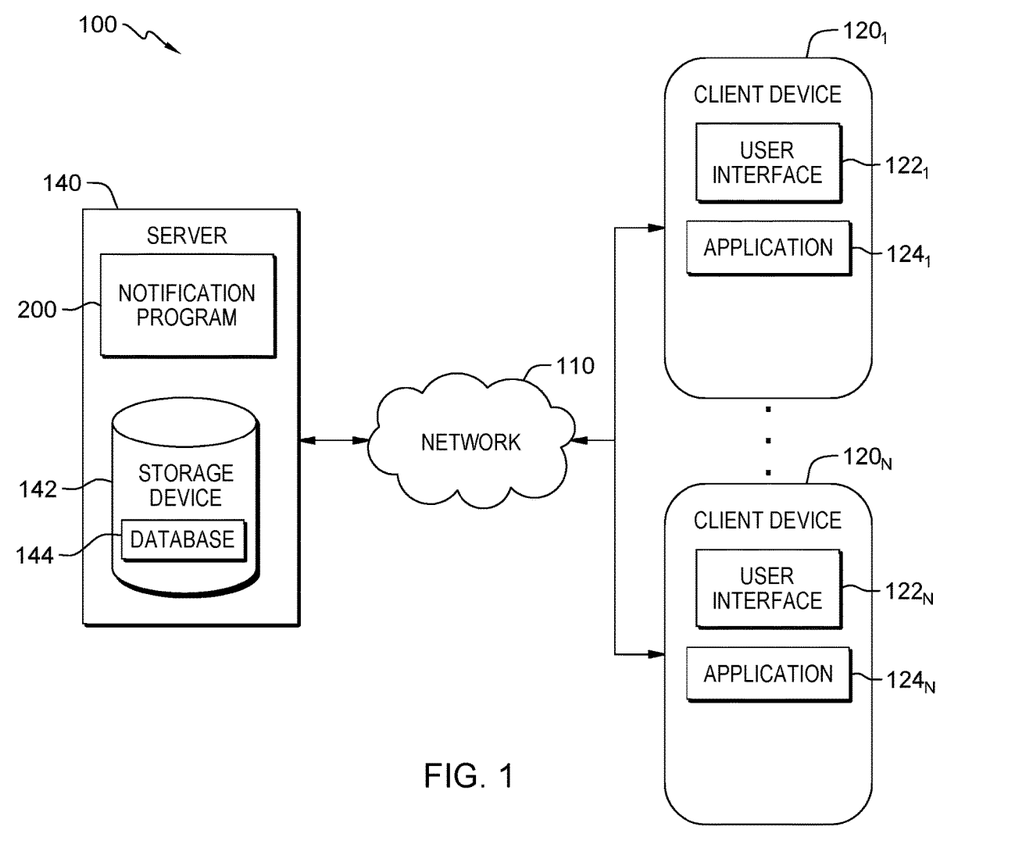
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Notification program 200 enables the authorized and secure processing of personal data. Notification program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Notification program 200 provides information regarding personal data and the nature (e.g., type, scope, purpose, duration, etc.) of the processing. Notification program 200 provides the user with copies of stored personal data. Notification program 200 allows the correction or completion of incorrect or incomplete personal data. Notification program 200 allows the immediate deletion of personal data.

Distributed data processing environment 100 includes server 140 and client device $120_1$ through client device $120_N$, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140 and client device $120_1$ through client device $120_N$, and other computing devices (not shown) within distributed data processing environment 100.

Client device $120_1$ through client device $120_N$ can be one or more of a laptop computer, a tablet computer, a smart phone, smart watch, a smart speaker, virtual assistant, or any programmable electronic device capable of communicating with various components and devices within distributed data processing environment 100, via network 110. In general, client device $120_1$ through client device $120_N$ represents one or more programmable electronic devices or combination of programmable electronic devices capable of executing machine readable program instructions and communicating with other computing devices (not shown) within distributed data processing environment 100 via a network, such as network 110. Client device $120_1$ through client device $120_N$ may include components as depicted and described in further detail with respect to FIG. 3, in accordance with embodiments of the present invention.

Client device $120_1$ through client device $120_N$ may include respective instances of user interface $122_1$ and application $124_1$, which each correspond to a respective instance of a client device and perform equivalent functions in the respective instance of the client device. In various embodiments of the present invention a user interface is a program that provides an interface between a user of a device and a plurality of applications that reside on the client device. A user interface, such as user interface $122_1$, refers to the information (such as graphic, text, and sound) that a program presents to a user, and the control sequences the user employs to control the program. A variety of types of user interfaces exist. In one embodiment, user interface $122_1$ is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface $122_1$ is a script or application programming interface (API).

Application $124_1$ is a computer program designed to run on client device $120_1$. An application frequently serves to provide a user with similar services accessed on personal computers (e.g., web browser, playing music, or other media, etc.). In one embodiment, application $124_1$ is mobile application software. For example, mobile application software, or an "app," is a computer program designed to run on smart phones, tablet computers and other mobile devices. In another embodiment, application $124_1$ is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application $124_1$ is a client-side application of notification program 200.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device $120_{1-N}$ and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and notification program 200. Storage device 142 can be implemented with any type of storage device, for example, persistent storage 305, which is capable of storing data that may be accessed and utilized by client device $120_{1-N}$ and server 140, such as a database server, a hard disk drive, or a flash memory. In one embodiment storage device 142 can represent multiple storage devices within server 140. In various embodiments of the present invention, storage device 142 stores a plurality of information, such as database 144. Database 144 may represent one or more organized collections of data stored and accessed from server 140. For example, database 144 includes notification type, notification source, device type, and user preferences. In one embodiment, data processing environment 100 can include additional servers (not shown) that host additional information that accessible via network 110.

In various embodiments of the present invention notification program 200 delivers an alert, or alerts, to Internet of Things (IoT) enabled devices that ensures successful user notification while avoiding duplicate alerts that compromise value, use, and responsiveness, which maximizes user attentiveness and minimizes notification redundancy. In one embodiment, notification program 200 provides one or more notification delivery options to client device $120_{1-N}$. For example, notification program 200 can provide message notification delay for a plurality of IoT enabled devices (e.g., client device $120_{1-N}$) based on activity. In this example, notification program 200 identify an IoT enabled device of the plurality of IoT enabled devices that a user is currently using. Also, notification program 200 can delay or route a notification based on preferences of the user and notification types being delivered (e.g., source, type, scope, etc.). Alternatively, notification program 200 can provide message notification delay based on a preferred device (e.g., device hierarchy) of the user.

In another embodiment, notification program 200 delivers a notification to client device $120_{1-N}$. For example, notification program 200 identifies an IoT enabled device that a user is currently interacting with and notification program 200 marks the IoT enabled device as an active device as well as a primary notification device. In this example, notification program 200 identifies a plurality of IoT enabled devices connected to a notification hook for the IoT enabled devices and delays delivery of a notification for a defined time period to the plurality of IoT enabled devices. Additionally, notification program 200 can transmit a cancellation message to the plurality of IoT enabled devices, which halts delivery of the notification the plurality of IoT enabled devices.

Figure 2:
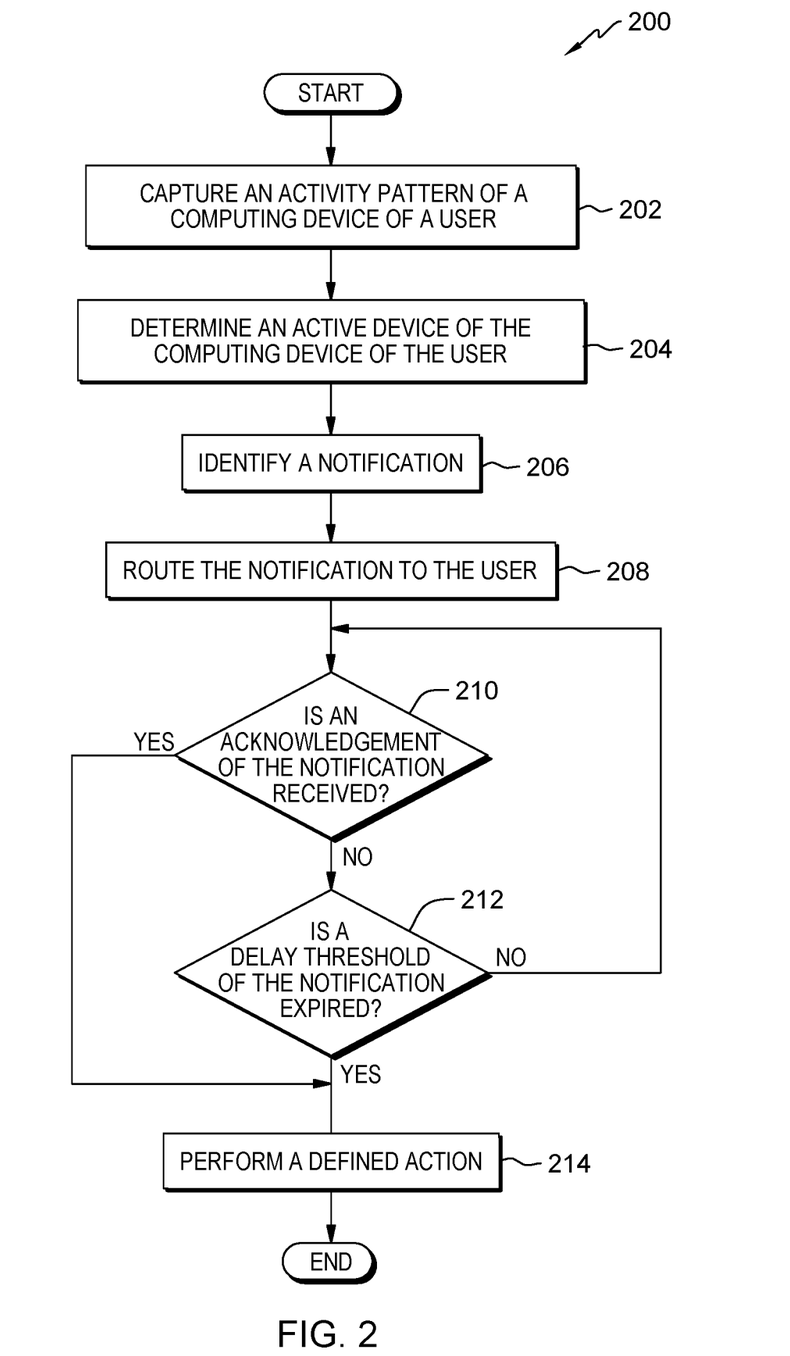
FIG. 2 is a flowchart depicting operational steps of a program for delivering a notification to an IoT enabled device that ensures successful user notification while avoiding duplicate notifications, in accordance with embodiments of the present invention.

FIG. 2 is a flowchart depicting operational steps of notification program 200, a program that delivers a notification to an IoT enabled device that ensures successful user notification while avoiding duplicate notifications, in accordance with embodiments of the present invention. In one embodiment, notification program 200 initiates in response to a user connecting client device $120_{1-N}$ to notification program 200 through network 110. For example, notification program 200 initiates in response to a user registering (e.g., opting in) each of a plurality of IoT enabled devices (e.g., client device $120_{1-N}$) with notification program 200 via a WLAN (e.g., network 110). In another embodiment, notification program 200 is a background application that continuously monitors client device $120_{1-N}$. For example, notification program 200 is a client-side application (e.g., application $124_{1-N}$) that initiates upon booting of each of a plurality of IoT enabled devices (e.g., client device $120_{1-N}$) a user and monitors events of each of the IoT enabled devices.

In step 202, notification program 200 captures an activity pattern of a computing device of a user. In one embodiment, notification program 200 identifies user interaction with client device $120_{1-N}$. For example, notification program 200 monitors one or more user interfaces (e.g., user interface $122_{1-N}$) of a plurality of IoT enabled devices (e.g., client device $120_{1-N}$) to detect activity patterns of a user. Additionally, an activity pattern is an interaction of the user with a computing device with IoT capabilities, which may include but is not limited to mouse movement, keyboard interaction, touch screen interaction, and/or audible commands, that indicates use by the user of an IoT enabled device (e.g., client device $120_1$, mobile device, laptop, virtual assistant, etc.) of the plurality of IoT enabled devices. In this example, notification program 200 detects a user interaction of the user with a mobile device (e.g., client device $120_1$) and compares the user interaction with activity patterns of the mobile device to determine that a user has interacted with the mobile device.

In step 204, notification program 200 determines whether the computing device is an active device of the user. In one embodiment, notification program 200 identifies client device $120_1$ as an active device of a user. For example, notification program 200 uses activity patterns of a plurality of IoT enabled devices (e.g., client device $120_{1-N}$) captured in step 202 to identify a computing device with IoT capabilities the plurality of IoT enabled devices of that a user is currently utilizing. In this example, notification program 200 can compare activity patterns of the plurality of IoT enabled devices to identify the computing device with the most recent activity pattern and mark the computing device as the active device (e.g., client device $120_1$). In an alternative embodiment, notification program 200 compares activity patterns of the plurality of IoT enabled devices over a defined period of time to determine the computing device that the user utilizes the most during the defined time period and mark the computing device as the active device (e.g., client device $120_1$).

In another alternative embodiment, notification program 200 can utilize locations of the plurality of IoT enabled devices to determine a proximate distance of the computing device of the plurality of IoT enabled devices and mark the computing device that is nearest to the user as the active device (e.g., client device $120_1$). Additionally, notification program 200 may utilize the logic of one or more of the above-referenced examples to mark an active device.

In an example embodiment, a user has a plurality of IoT devices (e.g., smart watch, cell phone, virtual assistant, laptop, etc.) opted-in to notification program 200 in an office, which receive work chat notification alerts. In this example embodiment, the user may receive an overload of messages causing notifications to be sent each of the IoT devices, which can be very distracting in a workplace for the user and others in proximity to the user. Additionally, the user opts into notification program 200 that captures an active device of the user based on an activity pattern of each IoT device (e.g., mouse movement on a laptop, finger interaction on a smartphone or smart watch, vocal activity with a virtual agent, etc.).

In step 206, notification program 200 identifies a notification. In various embodiments of the present invention, notification program 200 utilizes hooking techniques, which alter or augment the behavior of an operating system, of applications, and/or of other software components by intercepting function calls or messages or events passed between software components. In one embodiment, notification program 200 identifies a notification of client device $120_{1-N}$. For example, notification program 200 detects that a notification is generated by a WUI of a computing device (e.g., client device $120_2$) of a plurality of IoT enabled devices of a user. In this example, notification program 200 intercepts an alert corresponding to the notification of the computing device and extracts information (e.g., notification type, notification source, urgency, etc.) corresponding to the notification. Additionally, notification program 200 stores the extracted information in a database (e.g., database 144) associated with a profile of the user.

In an example embodiment, a laptop (e.g., client device $120_1$) of a user can generate a chat notification causes the laptop to display a pop up, a cell phone (e.g., client device $120_2$) of the user to buzz and beep, a smart watch (e.g., client device $120_3$) of the user to vibrate, and a virtual assistant (e.g., client device $120_4$) of a user to transmit an audio notification. However, notification program 200 utilizes a hook to intercept a task corresponding to the chat notification prior to the performance of the task on the computing devices of the user. Additionally, notification program 200 allows the user to filter the chat notification alerts to optimally inform the user as an alternative to ignoring or disabling message notifications.

In step 208, notification program 200 routes the notification to the user. In one embodiment, notification program 200 transmits a notification to client device $120_1$ of a user. For example, notification program 200 sets an active device (e.g., client device $120_1$, mobile device) as primary pathway to deliver a notification to a user from a primary source (i.e., a device or application where a notification is generated). In this example, notification program 200 sets a defined time to delay delivery of the notification to one or more non-active IoT enabled devices (e.g., client device $120_{2-N}$). In an alternative example, notification program 200 uses a time frame defined by a user to delay delivery of a notification to one or more non-active IoT enabled devices.

In another embodiment, notification program 200 transmits a notification to a respective instance of client device $120_{1-N}$ based on preferences of a user. For example, notification program 200 transmits a notification to a user based on a priority level assigned to a device type (i.e., preference of a user). In this example, notification program 200 can push a notification to a user or prevent a notification from being delivered to a plurality of IoT enabled devices based on a device type (e.g., phones, tablets, laptops, smartwatches, etc.) being placed in a certain group that is assigned a priority level based on the preferences of a user. In another example, notification program 200 transmits a notification to a user based on a user preference based on a notification type. In this example, notification program 200 can push a notification to a user or prevent a notification from being delivered to a type of IoT enabled device based on a notification type (e.g., source, type, urgency, etc.).

In an example embodiment, notification program 200 identifies a chat message notification and marks a laptop (e.g., client device $120_1$) of the user as an active device. Additionally, notification program 200 determines that a user is on the laptop based on activity patterns of the laptop and prevents additional IoT enabled devices (e.g., client device $120_{2-N}$) from creating sounds or alerts for threshold time. In alternative example embodiment, notification program 200 determines that the laptop of the user receives a work email message and routes an alert corresponding to the work email message to the laptop of the user as defined by preference of the user for notifications of that type (e.g., email) and received by that source (e.g., work). Additionally, notification program 200 delays notifications to other additional IoT enabled device for two (2) minutes.

In decision step 210, notification program 200 determines whether an acknowledgement of the notification is received. In one embodiment, notification program 200 monitors a respective instance of user interface $122_{1-N}$ to determine whether a user acknowledges a notification. For example, notification program 200 monitors GUI (e.g., user interface $122_1$) of a laptop (e.g., client device $120_1$) to detect an action of a user that indicates acknowledgement (e.g., clicking a pop-up, swiping away a notification, etc.) of a notification transmitted to the laptop. Alternatively, notification program 200 can detect acknowledgement of a user by monitoring a voice user interface (e.g., user interface $122_1$) of a mobile device (e.g., client device $120_1$) or virtual agent (e.g., client device $120_1$) for an audible acknowledgment of the notification by a user.

In another embodiment, notification program 200 utilizes application $124_1$ to transmit a message indicating acknowledgment of a notification by a user via network 110. In another example, a client-side application of notification program 200 can generate and transmit an acknowledgment message to notification program 200 on a remote server (e.g., server 140) upon a user interacting with a transmitted notification.

If notification program 200 determines that a user does not acknowledge a notification (decision step 210, "NO" branch), then notification program 200 determines whether a delay threshold (e.g., a defined timeframe, as discussed in step 212) has elapsed. In one scenario, notification program 200 monitors a graphical user interface (GUI) (e.g., user interface $122_1$) of a laptop (e.g., client device $120_1$) and does not detect an action of a user that indicates acknowledgement (e.g., clicking a pop-up, swiping away a notification, etc.) of a notification transmitted to the laptop. In this scenario, notification program 200 continues to monitor the GUI of the laptop until a delay threshold (e.g., defined timeframe) has elapsed.

If notification program 200 determines that a user acknowledges a notification (decision step 210, "YES" branch), then notification program 200 performs a defined action (as discussed in step 214). In one scenario, notification program 200 monitors a graphical user interface (GUI) (e.g., user interface $122_1$) of a laptop (e.g., client device $120_1$) and detects a user clicking a pop-up of a notification transmitted to the laptop. In this scenario, notification program 200 alters delivery of the notification to additional non-active IoT enabled devices (e.g., client device $120_{2-N}$), as discussed in step 214 (i.e., cancelling delivery).

In decision step 212, notification program 200 determines whether a delay threshold of the notification has expired. In one embodiment, notification program 200 monitors a respective instance of application $124_{1-N}$ to determine whether a user acknowledges a notification within a defined timeframe. For example, notification program 200 determines that a user has not performed an action that indicates acknowledgement and monitors a timer (e.g., application $124_1$) of a laptop (e.g., client device $120_1$) to determine whether allotted time of a defined threshold (e.g., user defined, system defined, default, etc.) to acknowledge the notification remains.

If notification program 200 determines that a user does not acknowledge a notification and a defined timeframe has not expired (decision step 212, "NO" branch), then notification program 200 continues to monitor a GUI (e.g., user interface $122_1$) of a laptop (e.g., client device $120_1$) to detect an action of a user that indicates acknowledgement of the notification (as discussed in step 210). In one scenario, notification program determines that a user has not performed an action that indicates acknowledgement and that allotted time of a defined threshold of a timer (e.g., application $124_1$) of the laptop remains. In this scenario, notification program 200 continues to monitor the GUI of the laptop until the allotted time of the defined threshold of the timer expires.

If notification program 200 determines that a user acknowledges a notification and a defined timeframe has not expired (decision step 212, "YES" branch), then notification program 200 performs a defined action (as discussed in step 214). In one scenario, notification program 200 determines that a user has not performed an action that indicates acknowledgement and that allotted time of a defined threshold of a timer (e.g., application $124_1$) of the laptop has elapsed. In this scenario, notification program 200 alters delivery of the notification to additional non-active IoT enabled devices (e.g., client device $120_{2-N}$), as discussed in step 214 (i.e., delivering notification to all IoT enabled devices or according to user preferences).

In step 214, notification program 200 performs a defined action. In one embodiment, notification program 200 performs a predetermined task. For example, notification program 200 can cancel (e.g., predetermined task) subsequent dependent notifications transmissions to one or more IoT enabled devices. In an alternative example, notification program 200 can push (e.g., predetermined task) subsequent dependent notifications transmissions to one or more IoT enabled devices.

In one scenario, if notification program 200 determines that a user acknowledges a notification and a defined timeframe has not expired (e.g., decision step 210, "YES" branch), then notification program 200 cancels delayed notifications (e.g., dependent notifications) to a plurality of non-active IoT enabled devices (e.g., client device $120_{2-N}$). In another scenario, if notification program 200 determines that a user does not acknowledge a notification and a defined timeframe has expired (e.g., decision step 212, "YES" branch), then notification program 200 delivers delayed notifications (e.g., dependent notifications) to a plurality of non-active IoT enabled devices (e.g., client device $120_{2-N}$).

In an example embodiment, notification program 200 performs a task corresponding to behavior of a user. In this example embodiment, notification program 200 can transmit a cancellation message to additional IoT enabled devices (e.g., client device $120_{2-N}$) in response to a user acknowledging a chat message notification on a laptop (e.g., client device $120_1$) of the user within a threshold timeframe (e.g., two minutes). Additionally, notification program 200 can transmit the chat message notification to the additional IoT enabled devices in response to a user not acknowledging the chat message notification on the laptop of the user within the threshold timeframe.

Figure 3:
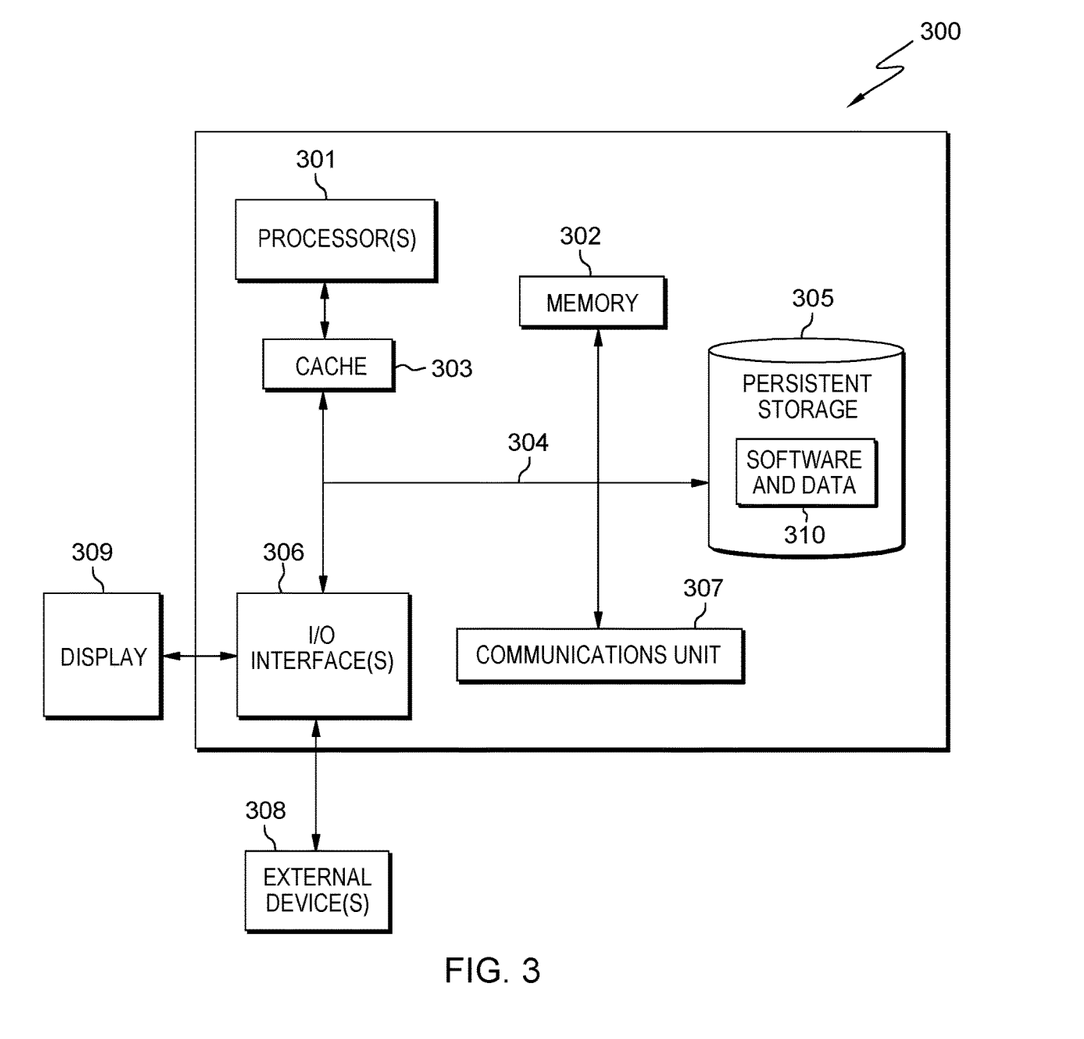
FIG. 3 is a block diagram of components of FIG. 1, in accordance with an embodiment of the present invention.

FIG. 3 depicts a block diagram of components of client device $120_{1-N}$ and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device $120_{1-N}$, software and data 310 includes data of user interface $122_{1-N}$ and application $124_{1-N}$. With respect to server 140, software and data 310 includes data of storage device 142 and notification program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    capturing, by one or more processors, a respective activity pattern of each of a plurality of internet of things (IoT) enabled devices of a user;
    determining, by one or more processors, an active device of the user from the plurality of IoT enabled devices based at least in part on an activity pattern of the active device, wherein the activity pattern is based at least in part on an interaction between the user and the active device, wherein the interaction is selected from the group consisting of a cursor movement, a keystroke, a touch screen interaction, and an audible command;
    utilizing the plurality of IoT enabled devices in communication with one or more processors to identify a notification for distribution to the user, wherein at least one of the plurality of IoT devices intercepts an alert corresponding to the notification and extracts information corresponding to the notification;
    intercepting, by one or more processors, delivery of the notification to non-active devices of the plurality of IoT enabled devices;
    delaying the delivery of the notification to non-active devices of the plurality of IoT enabled devices until a threshold is achieved;
    transmitting, by one or more processors, the notification to the active device of the user;
    determining the threshold is achieved; and
    responsive to determining the threshold is achieved, transmitting the notification to the non-active devices of the plurality of IoT enabled devices.

2. The method of claim 1, further comprising:
    determining, by one or more processors, that the user acknowledges the notification; and
    cancelling, by one or more processors, delivery of the notification to the non-active devices of the plurality of IoT enabled devices.

3. The method of claim 1, further comprising:
    determining, by one or more processors, that the notification is not acknowledged by the user.

4. The method of claim 1, wherein determining the active device of the user from the plurality of IoT enabled devices based at least in part on the activity pattern of the active device, further comprises:
    detecting, by one or more processors, a user interaction with a first IoT enabled device of the plurality of IoT enabled devices, wherein the user interaction is with a user interface of the first IoT enabled device;
    comparing, by one or more processors, an activity pattern of the first IoT enabled device with respective activity patterns of the plurality of IoT enabled devices;
    determining, by one or more processors, the user is currently utilizing the first IoT enabled device based at least in part on comparing respective activity patterns; and
    marking, by one or more processors, the first IoT enabled device as a primary pathway for delivery of a notification.

5. The method of claim 1, wherein identifying the notification for distribution to the user, utilizing of the plurality of IoT enabled devices, further comprises:
    detecting, by one or more processors, that the notification is generated;
    extracting, by one or more processors, a source of the notification; and
    extracting, by one or more processors, a type of the notification.

6. The method of claim 1, wherein intercepting delivery of the notification to non-active devices of the plurality of IoT enabled devices, further comprises:
    hooking, by one or more processors, an event of the plurality of IoT enabled devices, wherein the event corresponds to the notification; and
    delaying, by one or more processors, delivery of an alert corresponding to the event to the non-active devices of the plurality of IoT enabled devices for a defined timeframe.

7. The method of claim 1, wherein transmitting the notification to the active device of the user, further comprises:
    identifying, by one or more processors, a user-assigned rank of one or more IoT enabled devices;
    comparing, by one or more processors, the user assigned rank of the one or more IoT enabled devices; and
    delivering, by one or more processors, the notification to the one or more IoT enabled devices with the highest rank.

8. A computer program product comprising:
    one or more computer readable storage media and program instructions stored on the one or more computer readable storage media, the program instructions comprising:
    program instructions to capture a respective activity pattern of each of a plurality of internet of things (IoT) enabled devices of a user;
    program instructions to determine an active device of the user from the plurality of IoT enabled devices based at least in part on an activity pattern of the active device, wherein the activity pattern is based at least in part on an interaction between the user and the active device, wherein the interaction is selected from the group consisting of a cursor movement, a keystroke, a touch screen interaction, and an audible command;
    program instructions to utilize the plurality of IoT enabled devices to identify a notification for distribution to the user, wherein at least one of the plurality of IoT devices intercepts an alert corresponding to the notification and extracts information corresponding to the notification;
    program instructions to intercept delivery of the notification to non-active devices of the plurality of IoT enabled devices;
    program instructions to delay the delivery of the notification to non-active devices of the plurality of IoT enabled devices until a threshold is achieved;
    program instructions to transmit the notification to the active device of the user;
    program instructions to determine the threshold is achieved; and
    program instructions to, responsive to determining the threshold is achieved, transmit the notification to the non-active devices of the plurality of IoT enabled devices.

9. The computer program product of claim 8, further comprising program instructions, stored on the one or more computer readable storage media, to:
    determine that the user acknowledges the notification; and
    cancel delivery of the notification to the non-active devices of the plurality of IoT enabled devices.

10. The computer program product of claim 8, further comprising program instructions, stored on the one or more computer readable storage media, to:
    determine that the notification is not acknowledged by the user.

11. The computer program product of claim 8, wherein program instructions to determine the active device of the user from the plurality of IoT enabled devices based at least in part on the activity pattern of the active device, further comprise program instructions to:
- detect a user interaction with a first IoT enabled device of the plurality of IoT enabled devices, wherein the user interaction is with a user interface of the first IoT enabled device;
- compare an activity pattern of the first IoT enabled device with respective activity patterns of the plurality of IoT enabled devices;
- determine the user is currently utilizing the first IoT enabled device based at least in part on comparing respective activity patterns; and
- mark the first IoT enabled device as a primary pathway for delivery of a notification.

12. The computer program product of claim 8, wherein program instructions to identify the notification for distribution to the user, utilizing of the plurality of IoT enabled devices, further comprise program instructions to:
- detect that the notification is generated;
- extract a source of the notification; and
- extract a type of the notification.

13. The computer program product of claim 8, wherein program instructions to intercept delivery of the notification to non-active devices of the plurality of IoT enabled devices, further comprise program instructions to:
- hook an event of the plurality of IoT enabled devices, wherein the event corresponds to the notification; and
- delay delivery of an alert corresponding to the event to the non-active devices of the plurality of IoT enabled devices for a defined timeframe.

14. The computer program product of claim 8, wherein program instructions to transmit the notification to the active device of the user, further comprise program instructions to:
- identify a user-assigned rank of one or more IoT enabled devices;
- compare the user assigned rank of the one or more IoT enabled devices; and
- deliver notification to the one or more IoT enabled devices with the highest rank.

15. A computer system comprising:
- one or more computer processors;
- one or more computer readable storage media; and
- program instructions stored on the computer readable storage media for execution by at least one of the one or more processors, the program instructions comprising:
  - program instructions to capture a respective activity pattern of each of a plurality of internet of things (IoT) enabled devices of a user;
  - program instructions to determine an active device of the user from the plurality of IoT enabled devices based at least in part on an activity pattern of the active device, wherein the activity pattern is based at least in part on an interaction between the user and the active device, wherein the interaction is selected from the group consisting of a cursor movement, a keystroke, a touch screen interaction, and an audible command;
  - program instructions to utilize the plurality of IoT enabled devices to identify a notification for distribution to the user, wherein at least one of the plurality of IoT devices intercepts an alert corresponding to the notification and extracts information corresponding to the notification;
  - program instructions to intercept delivery of the notification to non-active devices of the plurality of IoT enabled devices;
  - program instructions to delay the delivery of the notification to non-active devices of the plurality of IoT enabled devices until a threshold is achieved;
  - program instructions to transmit the notification to the active device of the user;
  - program instructions to determine the threshold is achieved; and
  - program instructions to, responsive to determining the threshold is achieved, transmit the notification to the non-active devices of the plurality of IoT enabled devices.

16. The computer system of claim 15, further comprising program instructions, stored on the one or more computer readable storage media for execution by at least one of the one or more processors, to:
- determine that the user acknowledges the notification; and
- cancel delivery of the notification to the non-active devices of the plurality of IoT enabled devices.

17. The computer system of claim 15, further comprising program instructions, stored on the one or more computer readable storage media for execution by at least one of the one or more processors, to:
- determine that the notification is not acknowledged by the user.

18. The computer system of claim 15, wherein program instructions to determine the active device of the user from the plurality of IoT enabled devices based at least in part on the activity pattern of the active device, further comprise program instructions to:
- detect a user interaction with a first IoT enabled device of the plurality of IoT enabled devices, wherein the user interaction is with a user interface of the first IoT enabled device;
- compare an activity pattern of the first IoT enabled device with respective activity patterns of the plurality of IoT enabled devices;
- determine the user is currently utilizing the first IoT enabled device based at least in part on comparing respective activity patterns; and
- mark the first IoT enabled device as a primary pathway for delivery of a notification.

19. The computer system of claim 15, wherein program instructions to identify the notification for distribution to the user, utilizing of the plurality of IoT enabled devices, further comprise program instructions to:
- detect that the notification is generated;
- extract a source of the notification; and
- extract a type of the notification.

20. The computer system of claim 15, wherein program instructions to intercept delivery of the notification to non-active devices of the plurality of IoT enabled devices, further comprise program instructions to:
- hook an event of the plurality of IoT enabled devices, wherein the event corresponds to the notification; and
- delay delivery of an alert corresponding to the event to the non-active devices of the plurality of IoT enabled devices for a defined timeframe.

\* \* \* \* \*